US010793012B2

(12) United States Patent
Cash

(10) Patent No.: US 10,793,012 B2
(45) Date of Patent: Oct. 6, 2020

(54) MAGNETIC ENERGY CONVERTOR FOR VEHICLE AXLES

(71) Applicant: Gray Alexander Cash, Rialto, CA (US)

(72) Inventor: Gray Alexander Cash, Rialto, CA (US)

( * ) Notice: Subject to any disclaimer, the term of this patent is extended or adjusted under 35 U.S.C. 154(b) by 126 days.

(21) Appl. No.: 16/257,473

(22) Filed: Jan. 25, 2019

(65) Prior Publication Data

US 2019/0232807 A1 Aug. 1, 2019

Related U.S. Application Data

(60) Provisional application No. 62/622,257, filed on Jan. 26, 2018.

(51) Int. Cl.
*B60L 50/90* (2019.01)
*B60L 1/00* (2006.01)

(52) U.S. Cl.
CPC ................ *B60L 50/90* (2019.02); *B60L 1/20* (2013.01); *B60L 2220/44* (2013.01); *B60L 2220/50* (2013.01)

(58) Field of Classification Search
None
See application file for complete search history.

(56) References Cited

U.S. PATENT DOCUMENTS 6,291,901 B1 9/2001 Pefo
6,966,394 B2 * 11/2005 Fleming .................. B60K 6/10 180/165
8,928,168 B2 1/2015 Letang
9,145,894 B2 * 9/2015 Hoshi .................. F04D 13/024
10,583,707 B2 * 3/2020 Kaskowicz ............ F03B 13/00
2004/0238248 A1 * 12/2004 Fleming ................ B60K 6/105 180/165
2009/0267348 A1 10/2009 Trust
2012/0187749 A1 7/2012 Grady
2018/0304713 A1 * 10/2018 Kaskowicz ............ F03B 13/00

* cited by examiner

*Primary Examiner* — Kenneth J Hansen
*Assistant Examiner* — Jason Fountain

(57) ABSTRACT

A magnetic energy convertor for vehicle axles includes an annular housing, a rotor shaft, a bearing, an annular bracket, a magnetized female adaptor, a magnetized male adaptor, a magnetized impeller assembly, and a fluid turbine system. The rotor shaft is rotatably mounted within the annular bracket by the bearing. The annular housing is radially mounted around the annular bracket. The magnetized female adaptor is terminally mounted to the rotor shaft. The magnetized male adaptor is terminally mounted to the rotor shaft, opposite of the magnetized female adaptor. The magnetized impeller assembly is slidably engaged within the annular housing so that the magnetized impeller assembly can be magnetically engaged with the magnetized female adaptor and the magnetized male adaptor through the rotation of the rotor shaft. The fluid turbine system is in fluid communication with the annular housing, wherein the circulation of fluid flow generates electricity within the fluid turbine system.

13 Claims, 18 Drawing Sheets

MAGNETIC ENERGY CONVERTOR FOR VEHICLE AXLES

The current application claims a priority to the U.S. Provisional Patent application Ser. No. 62/622,257 filed on Jan. 26, 2018.

FIELD OF THE INVENTION

The present invention relates generally to an apparatus for an energy conversion device. More specifically, the present invention is an energy conversion device and is utilized to harness wasted rotational energy of the vehicle axle.

BACKGROUND OF THE INVENTION

When a vehicle is in motion through the drivetrain system and other essential vehicular systems, majority of energy is lost due to conversion of chemical energy to mechanical energy (gasoline powered vehicles), friction, wasted heat, drag, braking, rolling resistance, and other vehicular functionalities. Generally, there are three basic ways to recover wasted energy in a vehicle. First is the regenerative shock that spins a hydraulic motor to generate electricity through the fluid movement within the shocks. Second is the regenerative braking system converts the motion of the car's wheels in reverse so that the electric motor can functions as generators to convert unwanted kinetic energy into electricity. Third is the recovery of wasted heat from the engine exhaust through a thermoelectric system which converts heat directly into electricity. However, there is a need to further address energy loss of vehicle that is in motion.

It is an objective of the present invention is to provide a magnetic energy convertor for vehicle axles so that the wasted mechanical energy of the vehicle axle can be converted into the electrical energy. More specifically, the present invention converts the mechanical force that was naturally wasted through the rotation of the vehicle axle into electrical energy so that converted energy can be stored within the vehicle. When the vehicle axle of the vehicle turns either from propelling the vehicle, coasting, or wheels rotation, magnetized male and female adaptors the present invention magnetically rotates a plurality of fins that are positioned with a housing. The rotation of the plurality of fins moves liquid within a closed loop system, wherein the fluid movement and an integrated turbine system generate electricity.

DETAIL DESCRIPTIONS OF THE INVENTION

Figure 1:
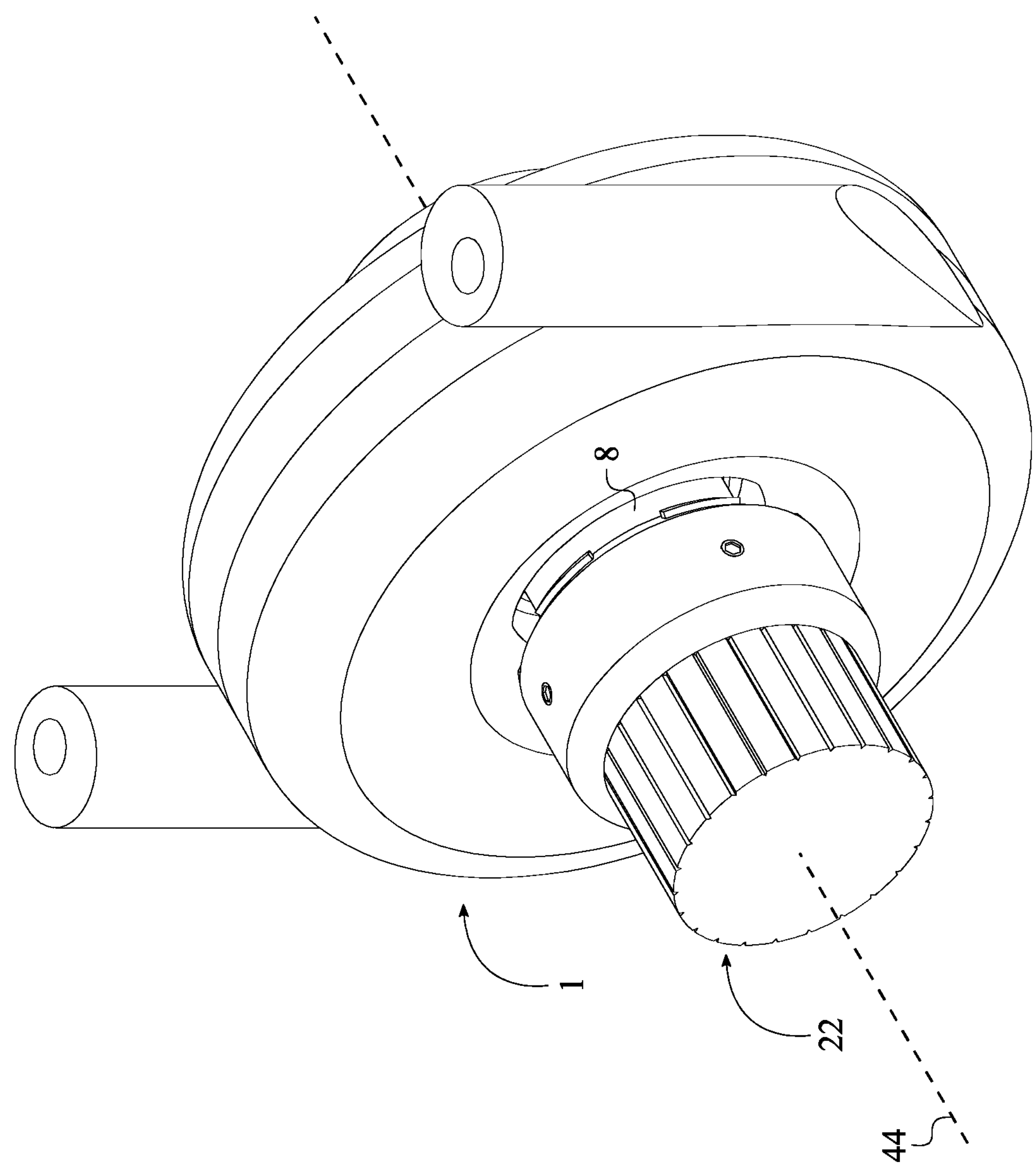
FIG. 1 is a perspective view of the present invention and the magnetized male adaptor, without showing the fluid turbine system.

All illustrations of the drawings are for the purpose of describing selected versions of the present invention and are not intended to limit the scope of the present invention.

The present invention is a magnetic energy convertor for vehicle axles to harness any mechanical energy that is generally wasted. The present invention is mounted in between the constant-velocity (CV) axle shaft and the wheel hub thus allowing the present invention to harness the rotational energy of the cv axle shaft. The present invention comprises an annular housing 1, a rotor shaft 8, a bearing 9, an annular bracket 12, a magnetized female adaptor 13, a magnetized male adaptor 22, a magnetized impeller assembly 27, and a fluid turbine system 31 as shown in FIG. 1-4.

Figure 2:
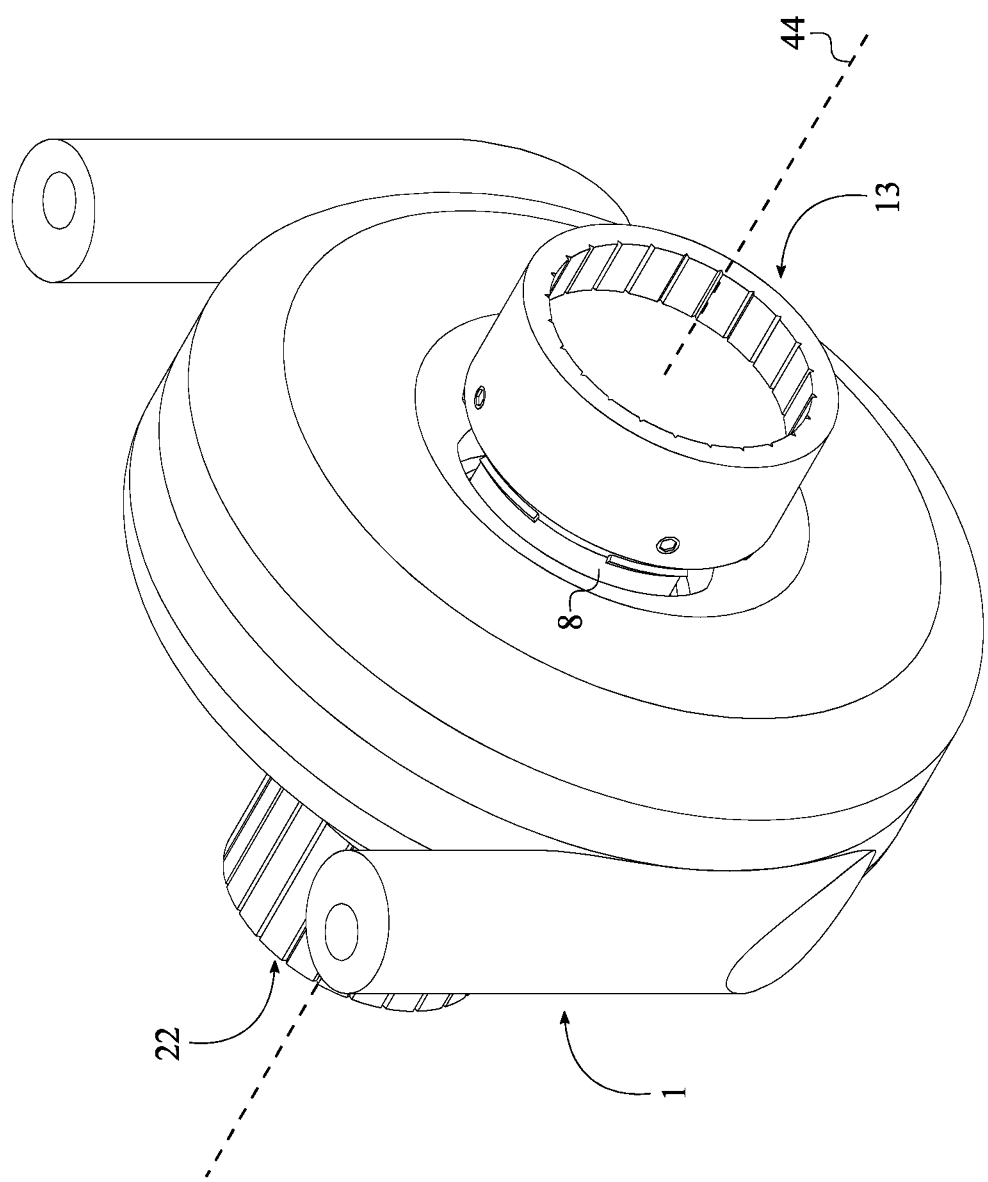
FIG. 2 is a perspective view of the present invention and the magnetized female adaptor, without showing the fluid turbine system.
Figure 3:
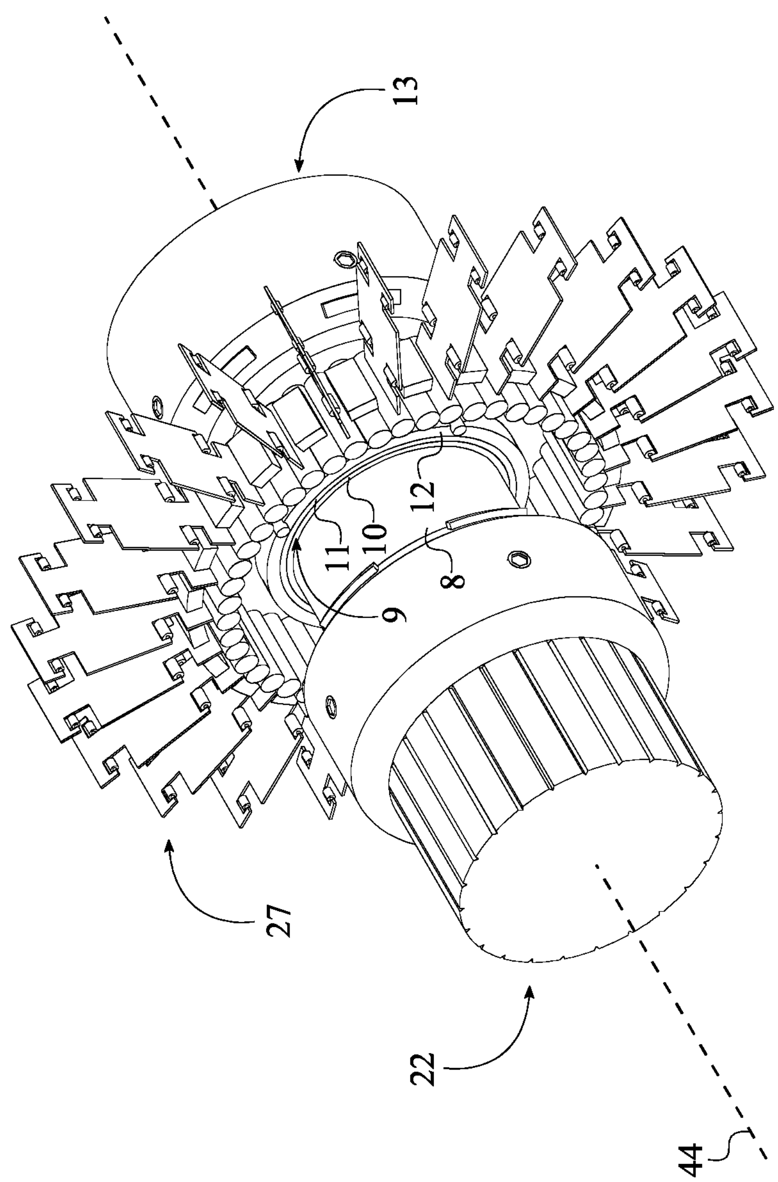
FIG. 3 is a perspective view of the present invention without showing the fluid turbine system and the annular housing.

In reference to the general positioning for the components of the present invention, the annular housing 1, the rotor shaft 8, the bearing 9, the annular bracket 12, the magnetized female adaptor 13, the magnetized male adaptor 22, and the magnetized impeller assembly 27 are concentrically positioned along a central axis 44 as shown in FIG. 1-3. As a result, aforementioned components of the present invention are either stationary or rotatably positioned along the central axis 44 thus optimizing overall functionality of present invention. In reference to the general configuration of the present invention that is shown in FIG. 1-4, the rotor shaft 8 is rotatably mounted within the annular bracket 12 by the bearing 9. The annular housing 1 is radially mounted around the annular bracket 12. In other words, the stationary positioning of the annular housing 1 allows the rotor shaft 8 to be rotatably mounted through the annular bracket 12 and bearing 9. The magnetized female adaptor 13 is terminally mounted to the rotor shaft 8 in such a way that the magnetized female adaptor 13 functions as a connecting body in between the present invention and the cv axle shaft. The magnetized male adaptor 22 is terminally mounted to the rotor shaft 8, wherein the magnetized male adaptor 22 is positioned opposite of the magnetized female adaptor 13. Similar to the magnetized female adaptor 13, the magnetized male adaptor 22 also functions as a connecting body in between the present invention and the wheel hub. The magnetized impeller assembly 27 is slidably engaged within the annular housing 1 so that the magnetized impeller assembly 27 can be magnetically engaged with the magnetized female adaptor 13 and the magnetized male adaptor 22. The fluid turbine system 31, closed looped system, is in fluid communication with the annular housing 1 so that a fluid flow can be circulated through the annular housing 1 and the fluid turbine system 31 to generate electricity.

The annular housing 1 is an enclosed body that slidably places the magnetized impeller assembly 27 and provides a path to the fluid flow to be circulated. The annular housing 1 can be made of high strength and rigid material that can withstand elevated temperature so that the magnetized impeller assembly 27 and the fluid turbine system 31 can be integrated into the annular housing 1. In reference to FIG. 5-8, the annular housing 1 comprises a first half-housing 2, a first annular track 3, an inlet 4, a second half-housing 5, a second annular track 6, and an outlet 7. The first annular track 3 traverses into the first half-housing 2, and the second annular track 6 traverses into the second half-housing 5. When the first half-housing 2 and the second half-housing 5 are combined together, the first annular track 3 and the second annular track 6 delineates a hollow and circular channel within the annular housing 1 to slidably place the magnetized impeller assembly 27. The inlet 4 traverses through the first half-housing 2 and into the first annular track 3 so that the inlet 4 is in fluid communication with the first annular track 3. The outlet 7 traverses through the second half-housing 5 and into the second annular track 6 so that the outlet 7 is in fluid communication with the second annular track 6. Resultantly, the inlet 4 and the outlet 7 are in fluid communication with each other through the first annular track 3 and the second annular track 6 so that the fluid flow can circulate through the annular housing 1.

Figure 10:
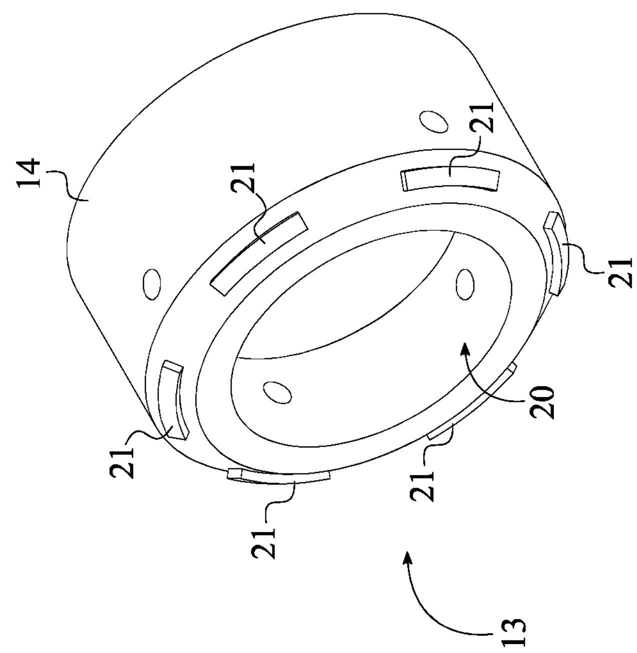
FIG. 10 is a perspective view of the magnetized female adaptor of the present invention, showing the proximal shaft opening.
Figure 9:
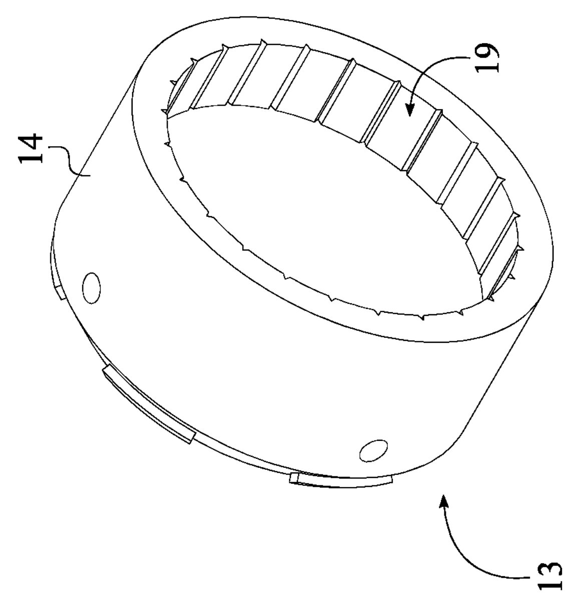
FIG. 9 is a perspective view of the magnetized female adaptor of the present invention, showing the axle opening.

The magnetized female adaptor 13 functions as the connecting body in between the present invention and the cv axle shaft so that the rotational energy of the cv axle shaft can be axially transferred into the present invention. The magnetized female adaptor 13 can be made of high strength and rigid material to improve the structural integrity and to withstand applied torque. In reference to FIG. 9-10, the magnetized female adaptor 13 comprises a proximal cylindrical body 14, an axle opening 19, a proximal shaft opening 20, and a plurality of first outer magnets 21. The axle opening 19 terminally traverses into the proximal cylindrical body 14 so that the axle opening 19 is able to interlock with the cv axle shaft. The proximal shaft opening 20 terminally traverses into the proximal cylindrical body 14 and positioned opposite of the axle opening 19. The proximal shaft opening 20 enables the rotor shaft 8 to be mounted to the magnetized female adaptor 13. The axle opening 19 and the proximal shaft opening 20 are concentrically positioned with each other about the proximal cylindrical body 14 so that the cv axle shaft can efficiently and directly transfer the rotational energy to the magnetized female adaptor 13, minimizing the vibration and energy loss. The plurality of first outer magnets 21 are radially connected around the proximal cylindrical body 14 and positioned adjacent to the proximal shaft opening 20. Due to the close proximity of the plurality of first outer magnets 21 and the annular housing 1, the present invention can maximize the magnetic attraction between the plurality of first outer magnets 21 and the magnetized impeller assembly 27.

Figure 11:
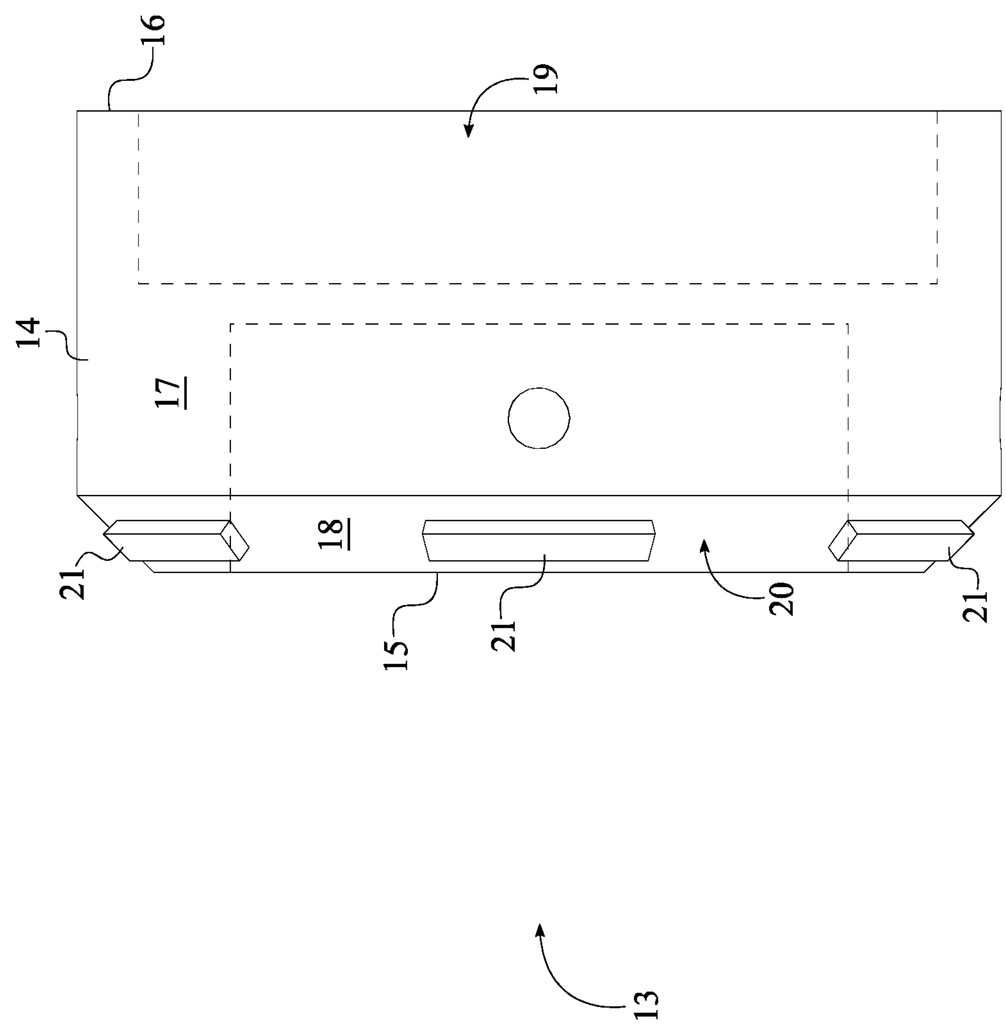
FIG. 11 is a side view of the magnetized female adaptor of the present invention.

The proximal cylindrical body 14 comprises a first base-surface 15, a second base-surface 16, a lateral surface 17, and a chamfered edge 18 as shown in FIG. 11. The first base-surface 15 and the second base-surface 16 delineate flat surface areas and positioned opposite of each other so that the axle opening 19 and the proximal shaft opening 20 can be traversed into the proximal cylindrical body 14. The lateral surface 17 and the chamfered edge 18 delineate the overall length of the proximal cylindrical body 14 and provide surface area for the plurality of first outer magnets 21 to be connected. The lateral surface 17 is perpendicularly connected to the second base-surface 16. The chamfered edge 18 is angularly connected to the first base-surface 15. In other words, the lateral surface 17 and the chamfered edge 18 are adjacently connected to each other, in between the first base-surface 15 and the second base-surface 16. In reference to FIG. 11, the axle opening 19 concentrically traverses into the proximal cylindrical body 14 from the second base-surface 16. The proximal shaft opening 20 concentrically traverses into the proximal cylindrical body 14 from the first base-surface 15. Furthermore, the diameter of the axle opening 19 and the proximal shaft opening 20 are delineated by the outer diameter of the cv axle shaft and the rotor shaft 8. The chamfered edge 18 is positioned adjacent to the proximal shaft opening 20, and the plurality of first outer magnets 21 are laterally connected onto the chamfered edge 18. Due to the chamfered edge 18 and the radial positioning of the plurality of first outer magnets 21, the magnetic attraction between the plurality of first outer magnets 21 and the magnetized impeller assembly 27 can be maximized within the present invention.

Figure 19:
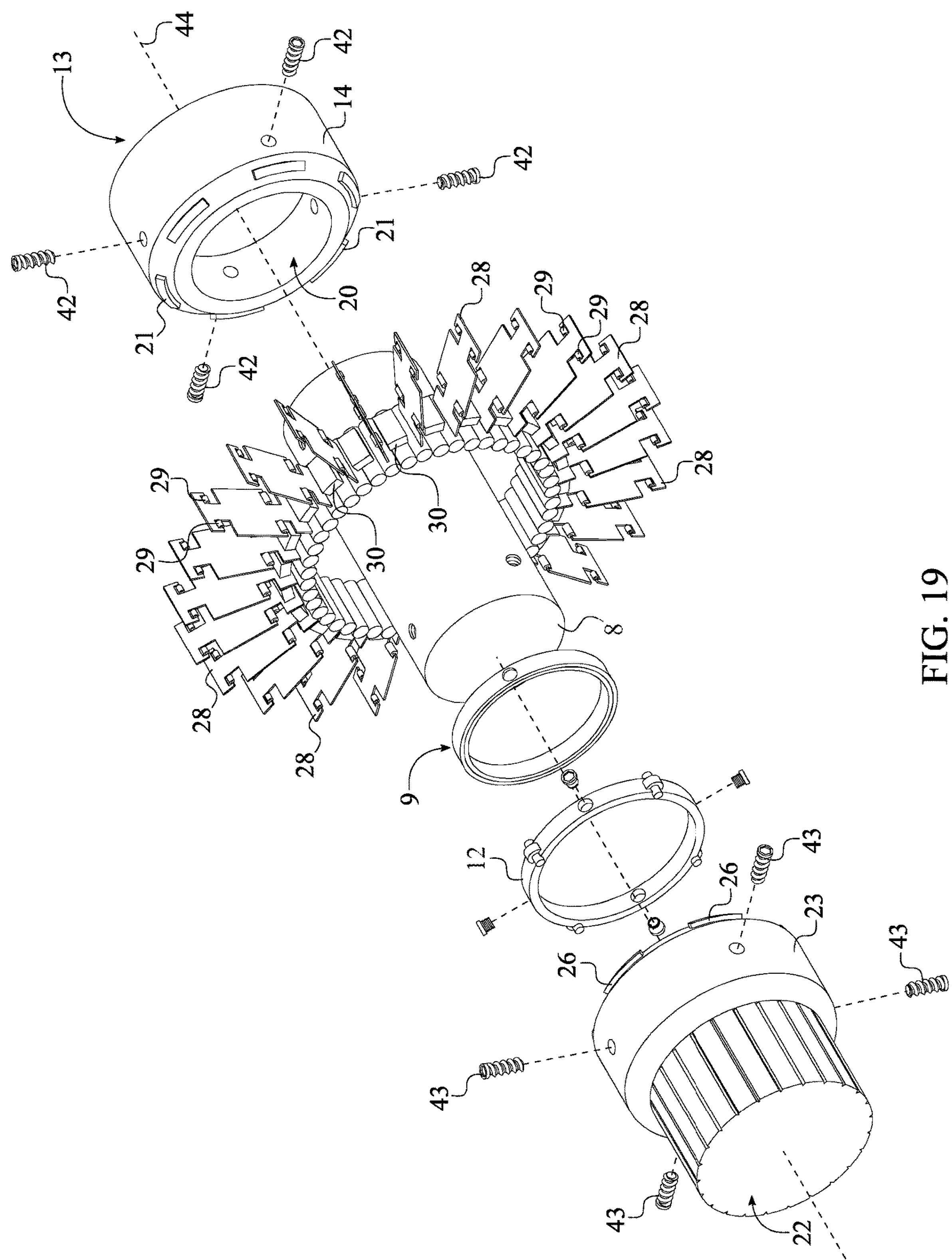
FIG. 19 is an exploded view of the present invention, without the annular housing and the fluid turbine system.

In reference to FIG. 19, the present invention further comprises a plurality of first fasteners 42 that secures the magnetized female adaptor 13 to the rotor shaft 8. The present invention preferably utilizes set screws as the plurality of first fasteners 42. When the proximal shaft opening 20 is concentrically engaged around the rotor shaft 8, the proximal cylindrical body 14 is radially mounted to the rotor shaft 8 by the plurality of first fasteners 42. More specifically, the plurality of first fasteners 42 radially inserted into the proximal cylindrical body 14 through the lateral surface 17. Then, the plurality of first fasteners 42, traverses through the proximal cylindrical body 14 and engages with the rotor shaft 8 thus securing the magnetized female adaptor 13 to the rotor shaft 8.

Figure 13:
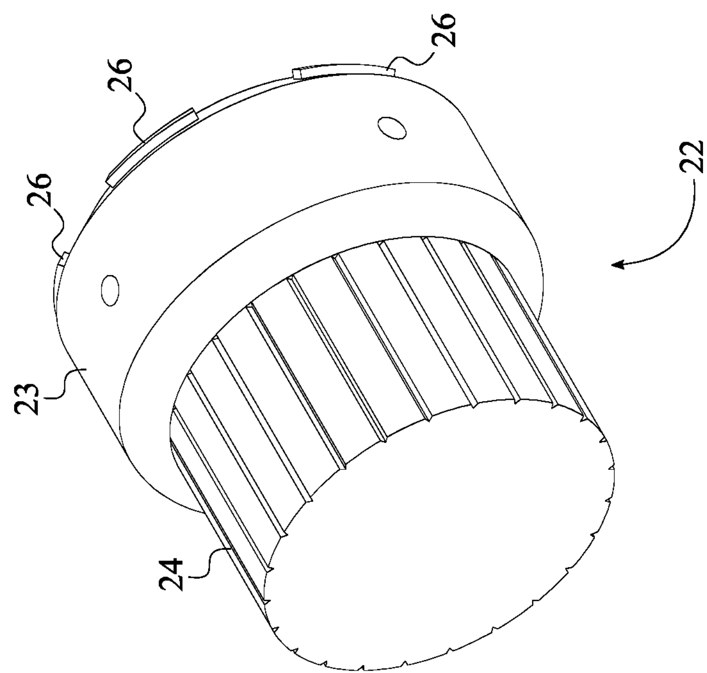
FIG. 13 is a perspective view of the magnetized male adaptor of the present invention, showing the wheel hub connector.
Figure 12:
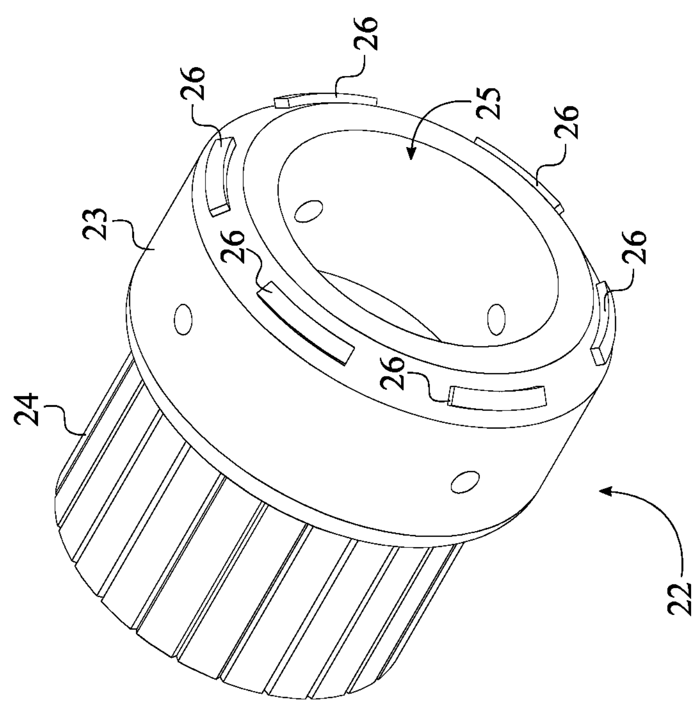
FIG. 12 is a perspective view of the magnetized male adaptor of the present invention, showing the distal shaft opening.

The magnetized male adaptor 22 functions as the connecting body in between the present invention and the wheel hub so that the rotational energy from the present invention can be axially transferred into the wheel hub. The magnetized male adaptor 22 can be made of high strength and rigid material to improve the structural integrity and to withstand applied torque. In reference to FIG. 12-13, the magnetized male adaptor 22 comprises a distal cylindrical body 23, a wheel hub connector 24, a distal shaft opening 25, and a plurality of second outer magnets 26. The wheel hub connector 24 is adjacently connected to the distal cylindrical body 23 so that the wheel hub is able to interlock with the present invention. The distal shaft opening 25 terminally traverses into the distal cylindrical body 23 and positioned opposite of the wheel hub connector 24. The distal shaft opening 25 enables the rotor shaft 8 to be mounted to the magnetized male adaptor 22. The wheel hub connector 24 and the distal shaft opening 25 are concentrically positioned with each other about the distal cylindrical body 23 so that the rotor shaft 8 can efficiently and directly transfer the rotational energy to the wheel hub, minimizing the vibration and energy loss. The plurality of second outer magnets 26 are radially connected around the distal cylindrical body 23 and positioned adjacent to the distal shaft opening 25. Due to the close proximity of the plurality of second outer magnets 26 and the annular housing 1, the present invention can maximize the magnetic attraction between the plurality of second outer magnets 26 and the magnetized impeller assembly 27.

Figure 14:
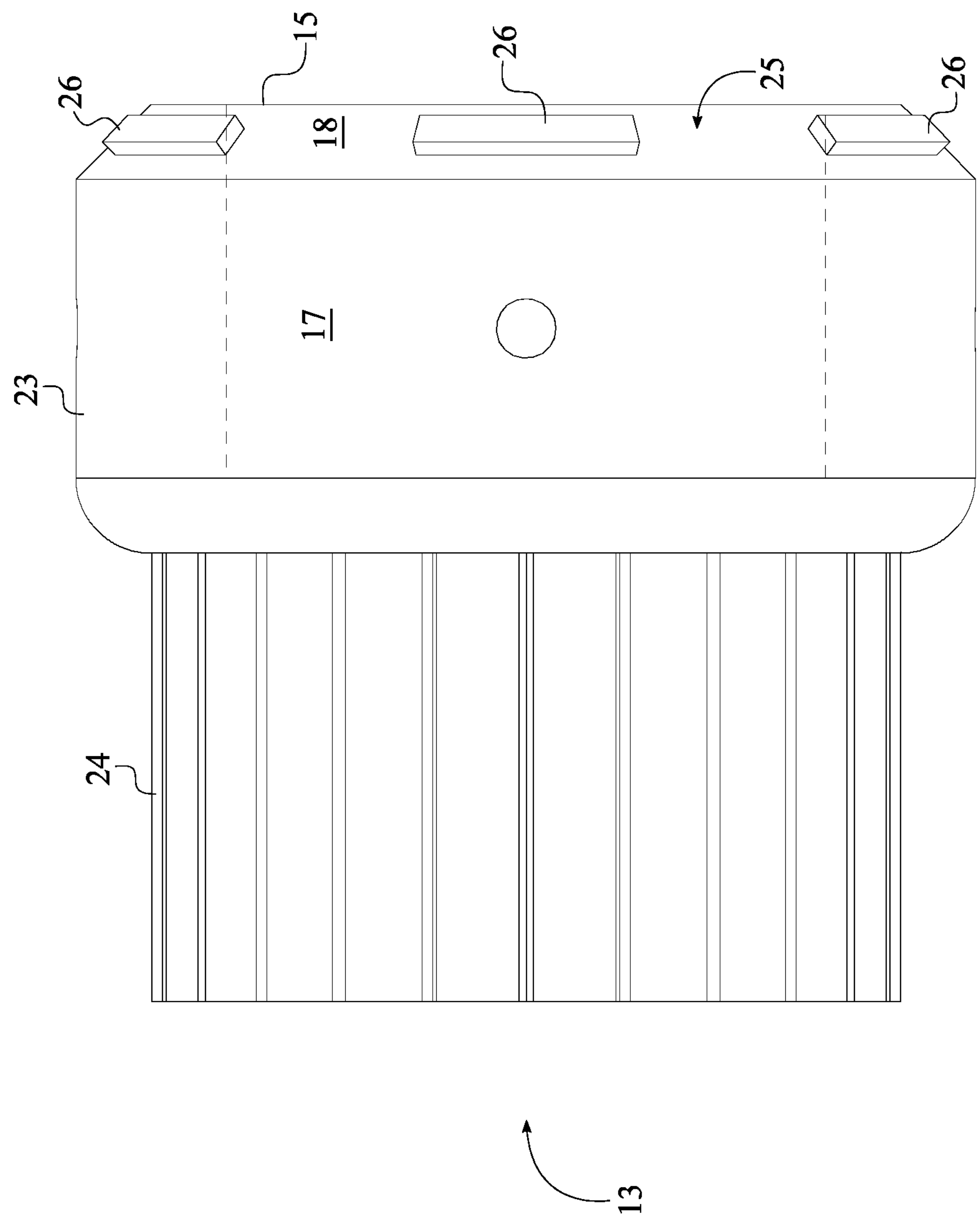
FIG. 14 is a side view of the magnetized male adaptor of the present invention.

The distal cylindrical body 23 comprises a first base-surface 15, a lateral surface 17, and a chamfered edge 18 as shown in FIG. 14. The first base-surface 15 and the wheel hub connector 24 are positioned opposite of each other about the distal cylindrical body 23 so that the wheel hub connector 24 can be connected and the proximal shaft opening 20 can be traversed into the distal cylindrical body 23. The lateral surface 17 and the chamfered edge 18 delineate the overall length of the distal cylindrical body 23 and provide surface area for the plurality of second outer magnets 26 to be connected. The lateral surface 17 is perpendicularly positioned to the first base-surface 15 as the chamfered edge 18 is angularly connected in between the first base-surface 15 and the lateral surface 17. In other words, the lateral surface 17 and the chamfered edge 18 are adjacently connected to each other, in between the first base-surface 15 and the wheel hub connector 24. In reference to FIG. 14, the distal shaft opening 25 concentrically traverses into the distal cylindrical body 23 from the first base-surface 15. Furthermore, the diameter of the wheel hub connector 24 and the distal shaft opening 25 are delineated by the outer diameter of a corresponding connecting member of the wheel hub and the rotor shaft 8. The chamfered edge 18 is positioned adjacent to the distal shaft opening 25, and the plurality of second outer magnets 26 are laterally connected onto the chamfered edge 18. Due to the chamfered edge 18 and the radial positioning of the plurality of second outer magnets 26, the magnetic attraction between the plurality of second outer magnets 26 and the magnetized impeller assembly 27 can be maximized within the present invention.

In reference to FIG. 19, the present invention further comprises a plurality of second fasteners 43 that secures the magnetized male adaptor 22 to the rotor shaft 8. The present invention preferably utilizes set screws as the plurality of first fasteners 42. When the distal shaft opening 25 is concentrically engaged around the rotor shaft 8, the distal cylindrical body 23 is radially mounted to the rotor shaft 8 by the plurality of second fasteners 43. More specifically, the plurality of second fasteners 43 radially inserted into the distal cylindrical body 23 through the lateral surface 17. Then, the plurality of second fasteners 43, traverses through the distal cylindrical body 23 and engages with the rotor shaft 8 thus securing the magnetized male adaptor 22 to the rotor shaft 8.

Figure 15:
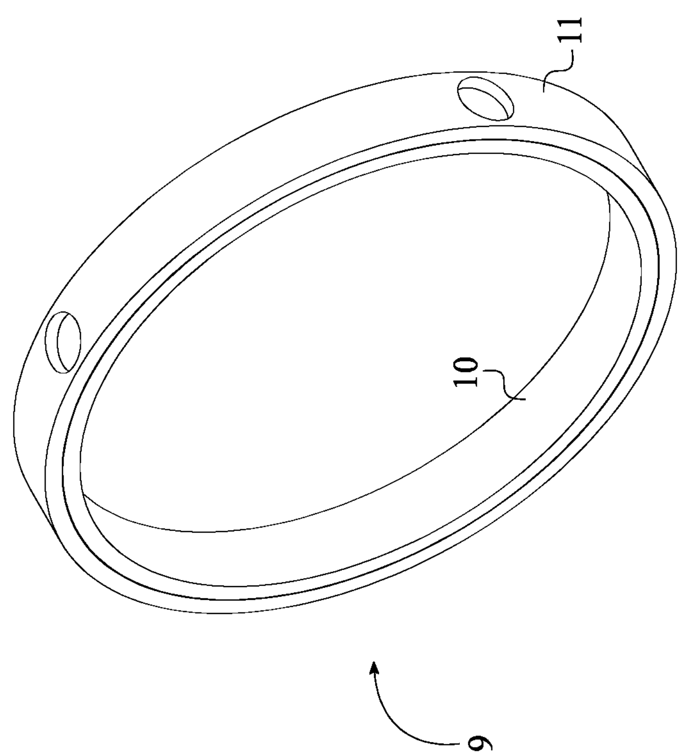
FIG. 15 is a perspective view of the bearing of the present invention.
Figure 16:
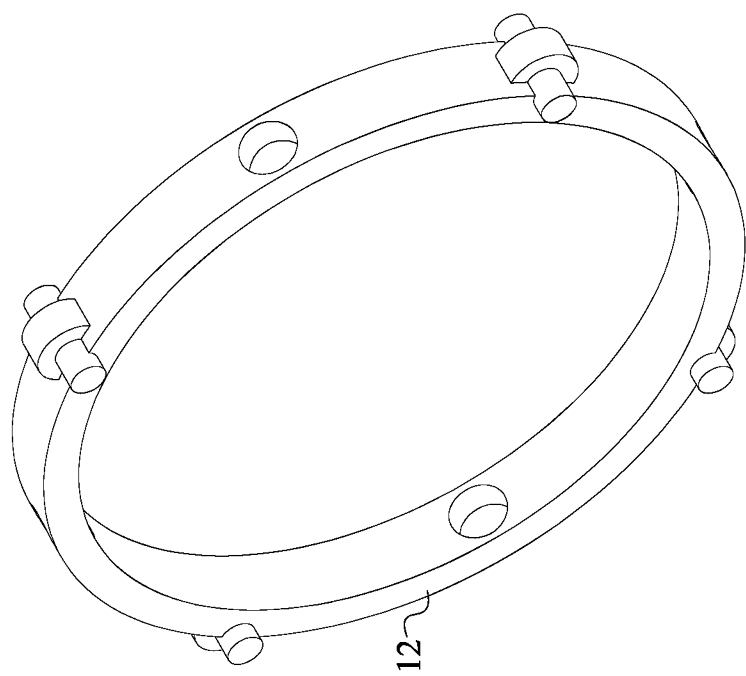
FIG. 16 is a perspective view of the annular bracket of the present invention.
Figure 17:
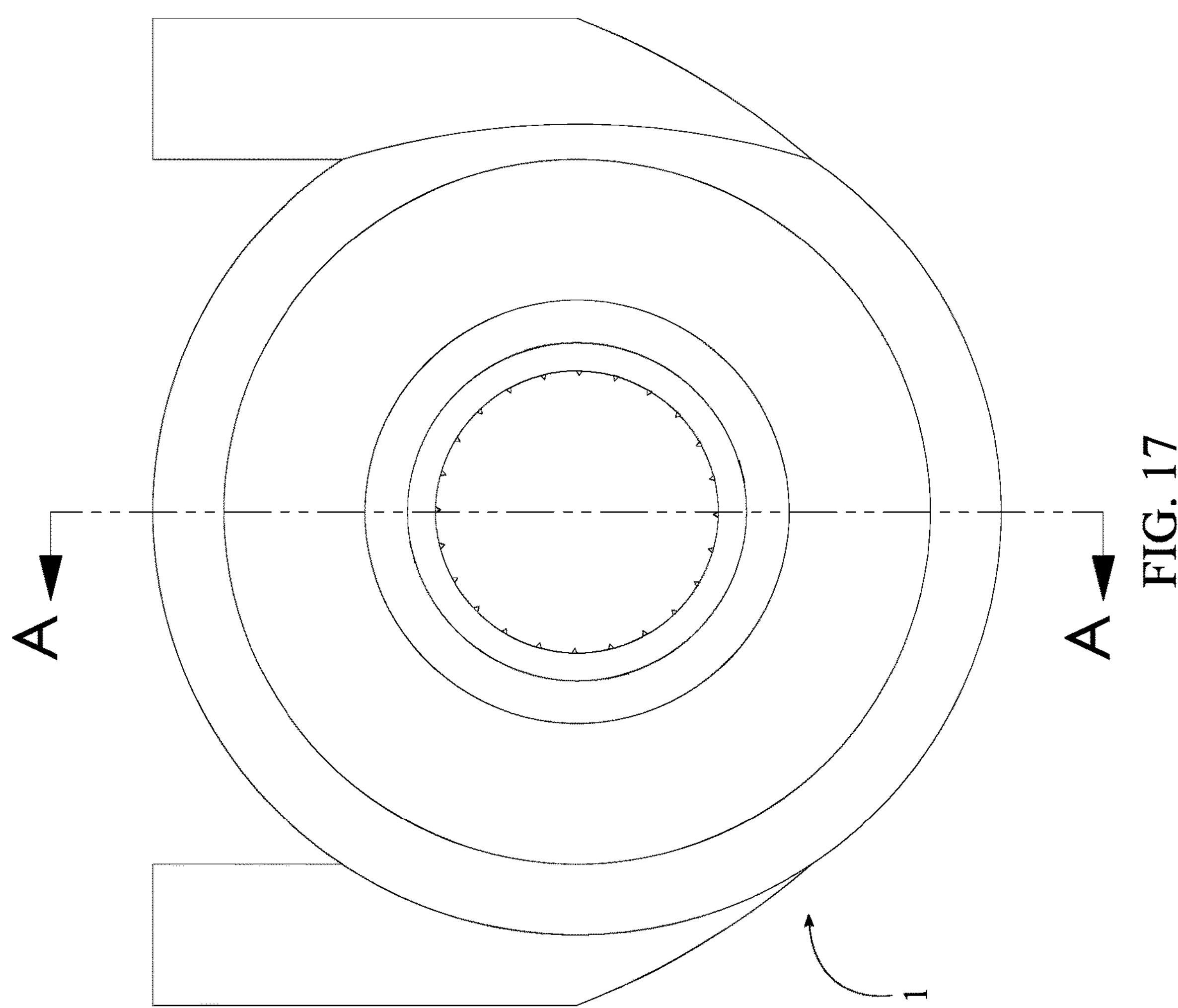
FIG. 17 is a front view of the present invention without the fluid turbine system, showing the plane upon which a cross sectional view is taken shown in FIG. 18.
Figure 18:
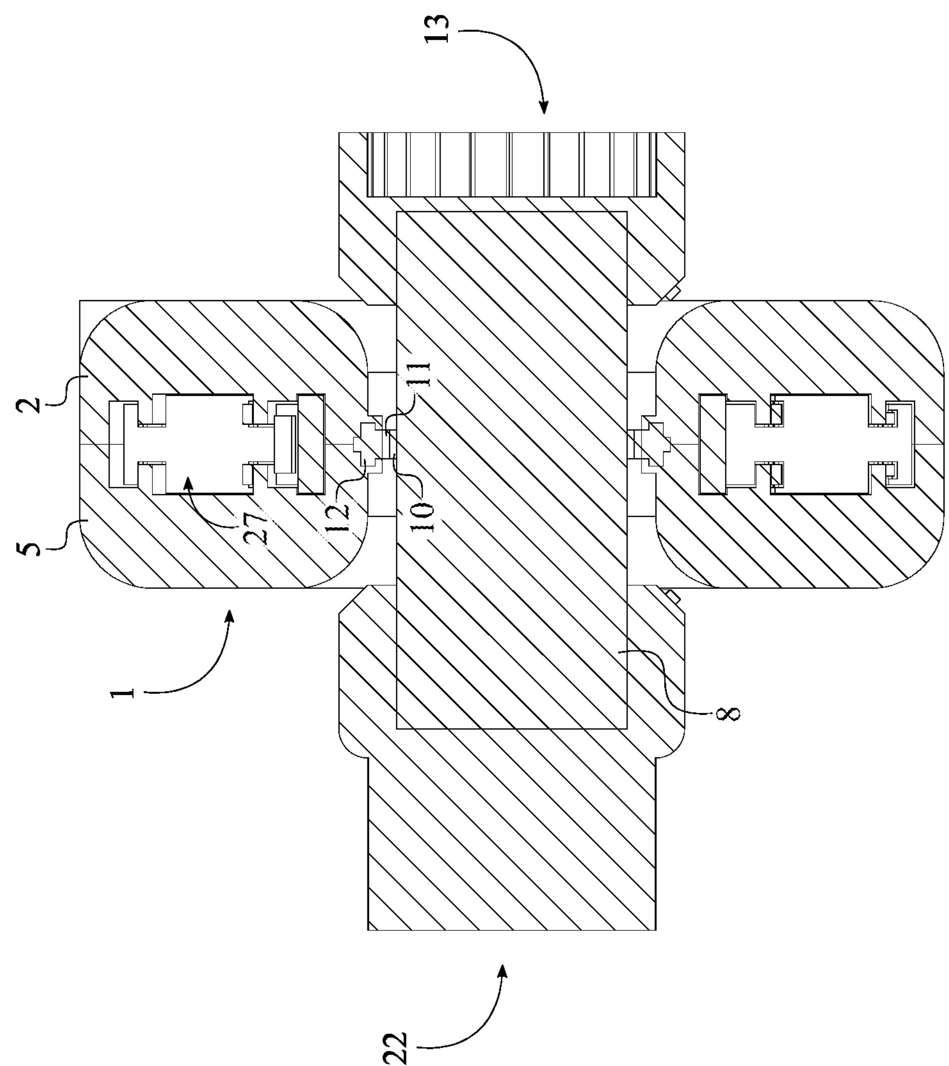
FIG. 18 is a cross section view of the present invention without the fluid turbine system taken along line A-A of FIG. 17.

The magnetized impeller assembly 27 is magnetically engaged with the magnetized female adaptor 13 and the magnetized male adaptor 22 so that the fluid flow can be circulated within the present invention. In reference to FIG. 17-19, the magnetized impeller assembly 27 comprises a plurality of fins 28, at least one pair of rollers 29, and a plurality of impeller magnets 30. The plurality of fins 28 is radially positioned within the first annular track 3 and the second annular track 6, wherein the plurality of fins 28 delineates an impeller like assembly. The at least one pair of rollers 29 is symmetrically connected to each of the plurality of fins 28 so that the at least one pair of rollers 29 can reduce heat generation and friction when the plurality of fins 28 are rotated within the annular housing 1. More specifically, the at least one pair of rollers 29 is rotatably engaged with the first annular track 3 and the second annular track 6 thus allowing each of the plurality of fins 28 to maintain their orientation and individually rotate about the central axis 44. The rotation of the plurality of fins 28 are initiated through the plurality of impeller magnets 30 that are radially positioned within the first annular track 3 and the second annular track 6. More specifically, each of the plurality of impeller magnets 30 is radially disposed within a pair of fins 28 from the plurality of fins 28 so that the plurality of impeller magnets 30 can be radially rotate around the central axis 44 through the magnetized female adaptor 13 and the magnetized male adaptor 22 which in turn rotates the plurality of fins 28. In other words, the plurality of impeller magnets 30 is magnetically engaged with the plurality of first outer magnets 21 and the plurality of second outer magnets 26 thus resulting the rotation of the plurality of fins 28 that is magnetically engaged with the plurality of impeller magnets 30;

The bearing 9, that facilitates the connection between the rotor shaft 8 and the annular bracket 12, comprises an inner race 10 and an outer race 11 that functions similar to traditional bearing 9. In reference to FIG. 15-16, the inner race 10 is radially mounted around the rotor shaft 8 while the annular bracket 12 is radially mounted around the outer race 11. A plurality of set screws or similar type of fasteners can be used to secure the bearing 9 to the rotor shaft 8 and annular bracket 12 so that the plurality of set screws can be positioned flushed with a mounting surface. Due to the positioning of the bearing 9, the annular bracket 12 is able to maintain a stationary position within the present invention while the rotor shaft 8, the magnetized female adaptor 13, and the magnetized male adaptor 22 are able to axially rotate within the present invention. Furthermore, the first half-housing 2 and the second half-housing 5 are radially mounted to each other through the annular bracket 12 thus maintaining a stationary position for the annular housing 1.

Figure 4:
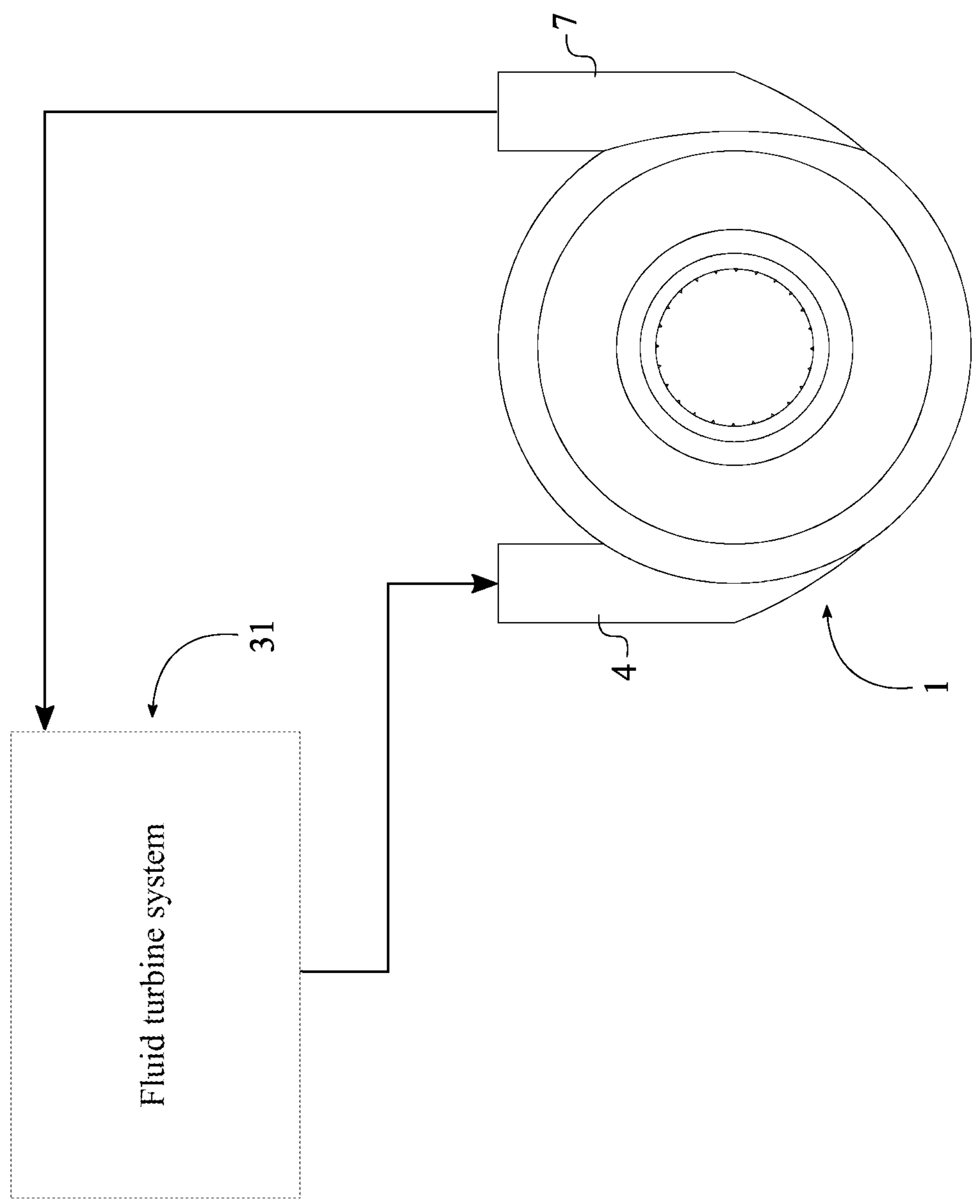
FIG. 4 is a schematic view of the present invention, showing the fluid communication with the fluid turbine system.
Figure 5:
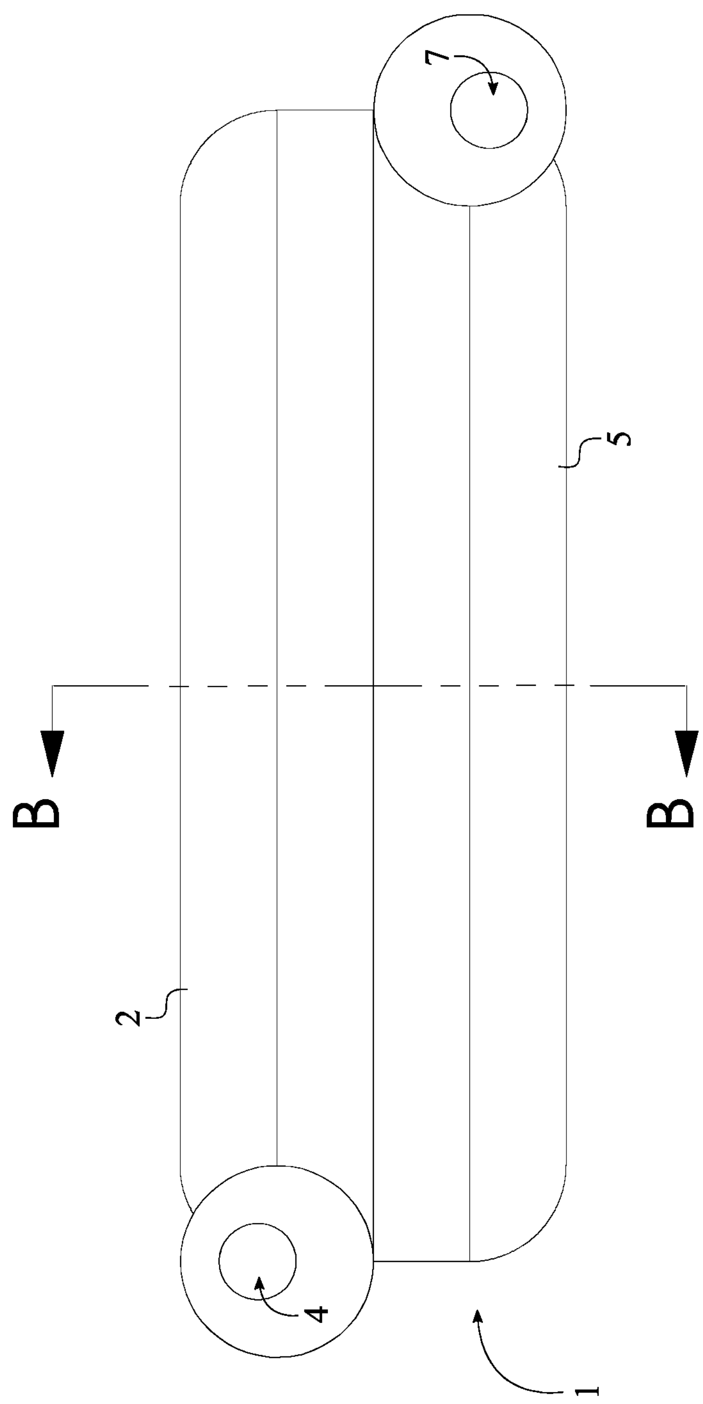
FIG. 5 is a top view of the present invention without the fluid turbine system, showing the plane upon which a cross sectional view is taken shown in FIG. 6.
Figure 6:
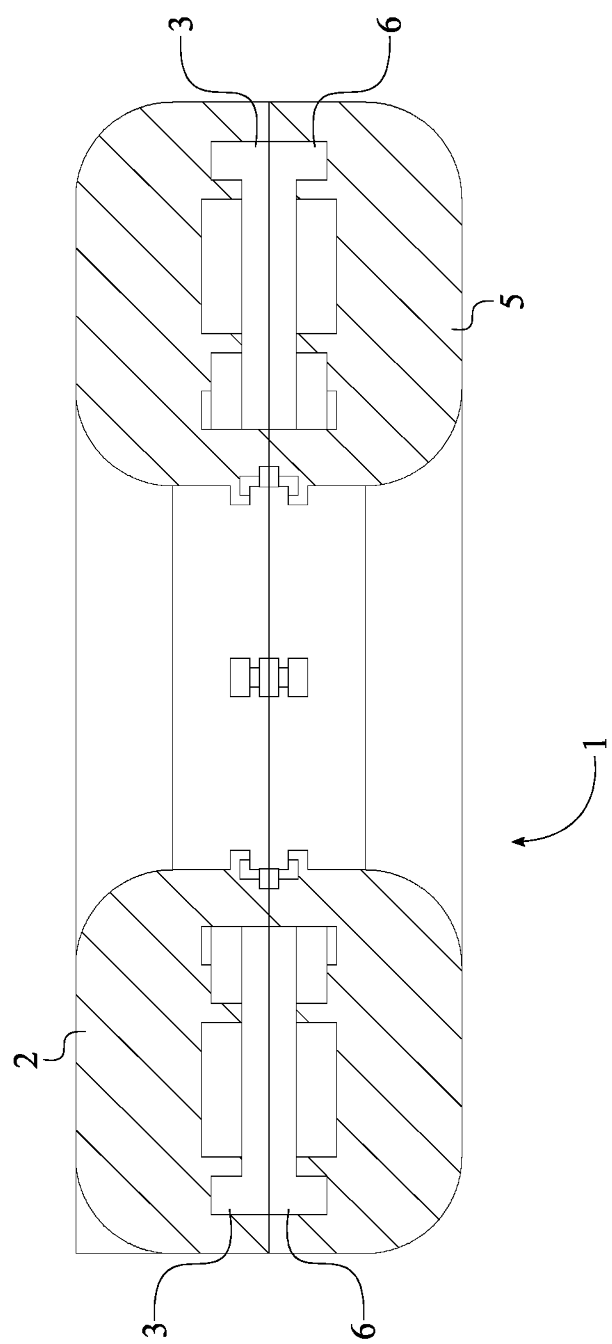
FIG. 6 is a cross section view of the present invention without the fluid turbine system taken along line B-B of FIG. 5.
Figure 7:
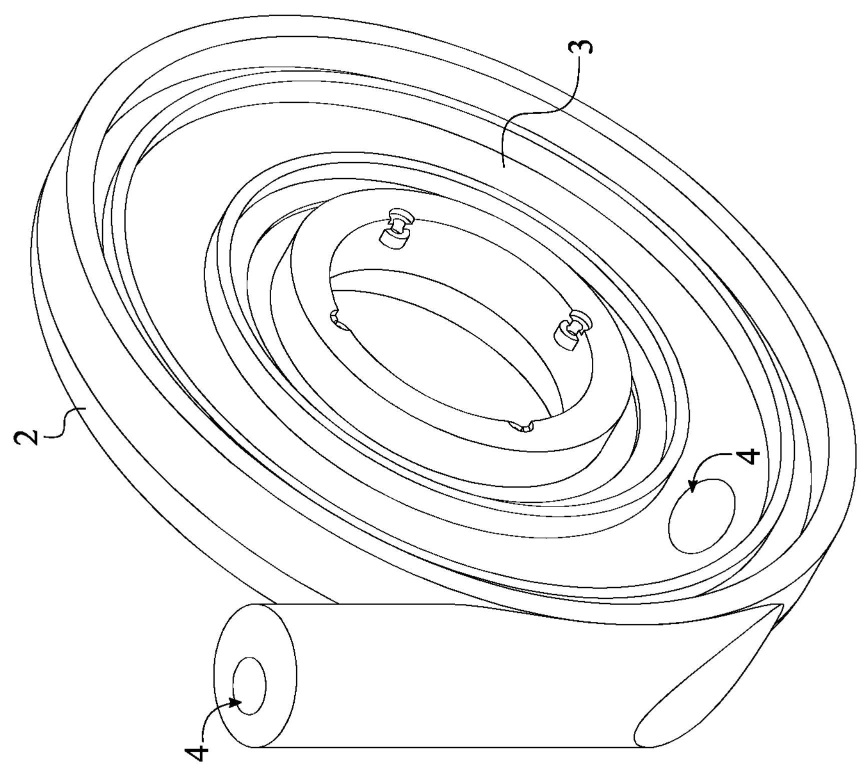
FIG. 7 is a perspective view of the first half-housing, the first annular track, and the inlet of the present invention.
Figure 8:
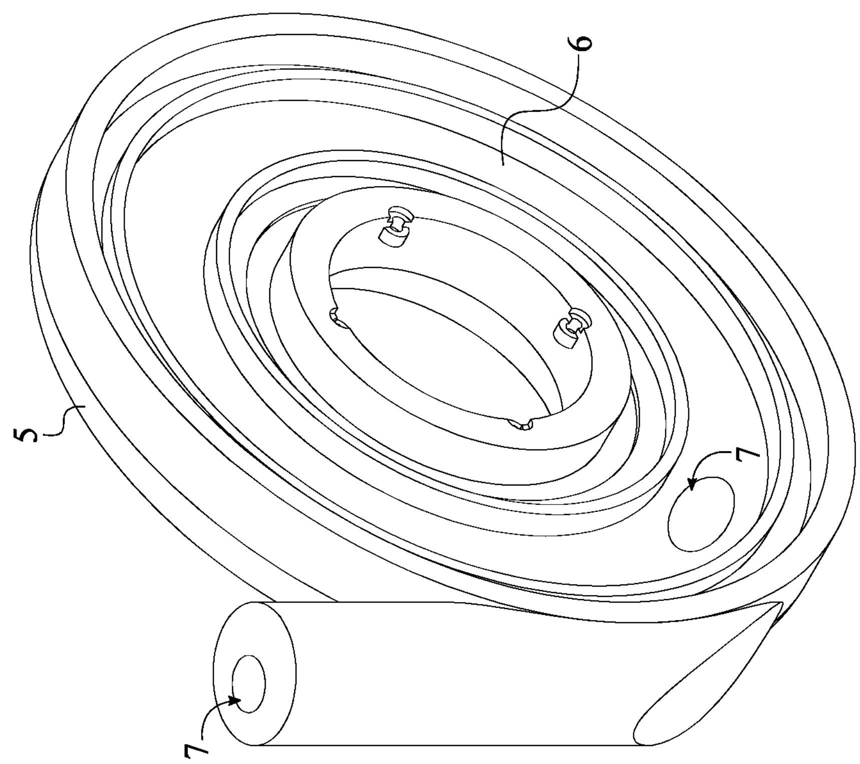
FIG. 8 is a perspective view of the second half-housing, the second annular track, and the outlet of the present invention.
Figure 20:
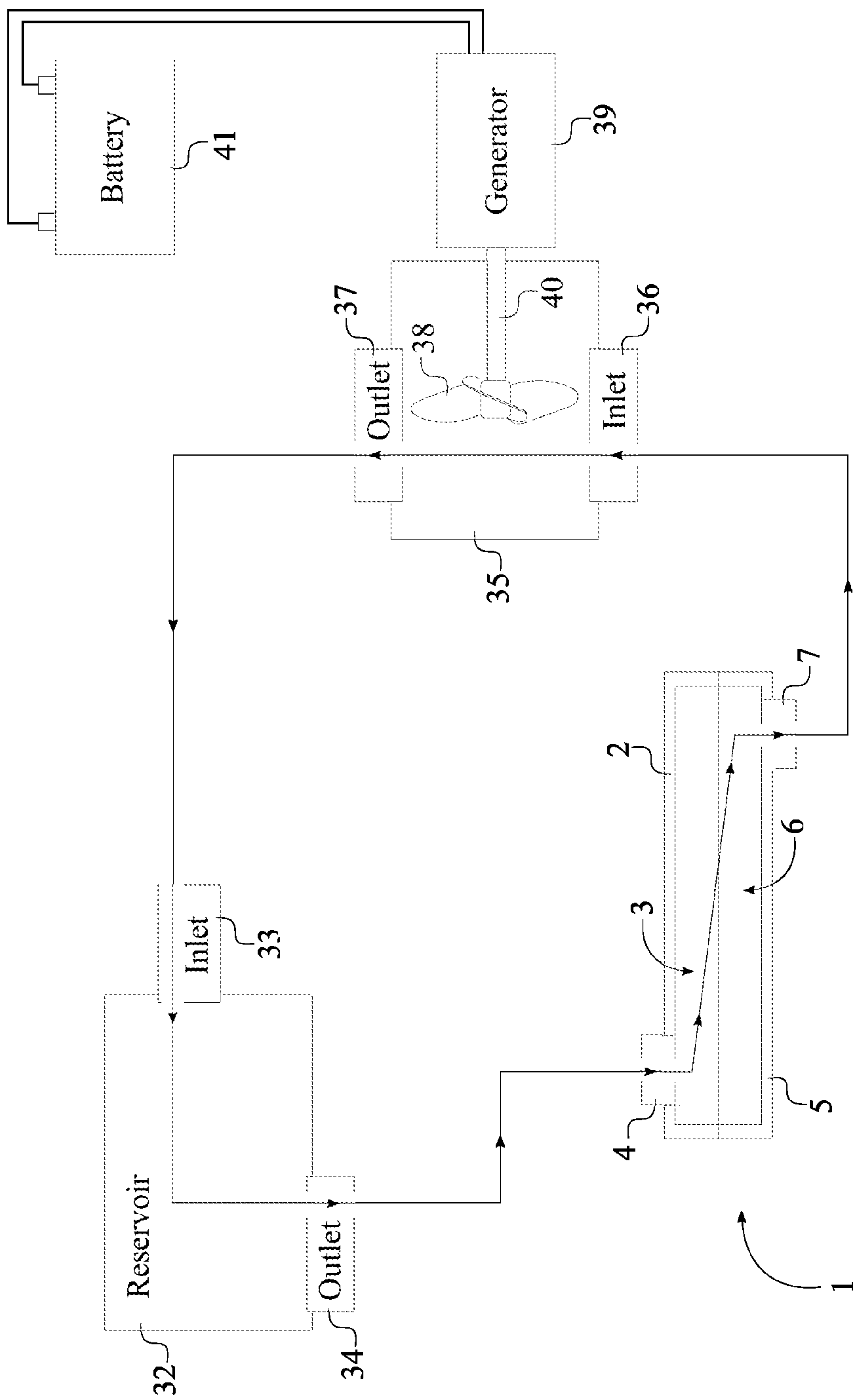
FIG. 20 is a schematic view of the present invention, showing the fluid communication and the electrical connection.

In reference to FIG. 4 and FIG. 20, the fluid turbine system 31 comprises a reservoir 32, a turbine housing 35, a turbine unit 38, a generator 39, and at least one battery 41. The turbine unit 38 that rotates due to the movement of the fluid flow is rotatably mounted within the turbine housing 35. The turbine housing 35 provides a path for the fluid flow to be channeled and functions as an enclosure for the turbine unit 38. As a result, the turbine housing 35 is able to maintain the closed looped system for the fluid flow. A rotor 40 of the generator 39 is mechanically coupled with the turbine unit 38, wherein the rotation of the turbine unit 38 axially rotates the rotor 40 of the generator 39. The generator 39 functions similar to hydro-generator, wherein the kinetic energy of the fluid flow is converted into electricity. The at least one battery 41 is electrically connected with the generator 39 so that the generated electricity can be stored. The reservoir 32 is in fluid communication with the annular housing 1 and the turbine housing 35 so that the fluid flow can be circulated within the present invention. The closed looped system of the fluid flow is shown in FIG. 20. More specifically, an outlet 34 of the reservoir 32 is in fluid communication with the inlet 4 of the annular housing 1 so that the fluid flow can be discharged into the annular housing 1. The fluid flow then circulates within the annular housing 1 and simultaneously rotates the plurality of fins 28 before exiting the annular housing 1. The fluid flow is able to discharge from the annular housing 1 to the turbine housing 35 as the outlet 7 of the annular housing 1 is in fluid communication with the inlet 36 of the turbine housing 35. The fluid flow is then circulated within the turbine housing 35 and simultaneously rotates the turbine unit 38. Once the turbine unit 38 is rotated, the fluid flow exists into the reservoir 32 as an outlet 37 of the turbine housing 35 is in fluid communication with an inlet 33 of the reservoir 32.

Although the invention has been explained in relation to its preferred embodiment, it is to be understood that many other possible modifications and variations can be made without departing from the spirit and scope of the invention as hereinafter claimed.

What is claimed is:

1. A magnetic energy convertor for vehicle axles comprises:

an annular housing;

a rotor shaft;

a bearing;

an annular bracket;

a magnetized female adaptor;

a magnetized male adaptor;

a magnetized impeller assembly;

a fluid turbine system;

the annular housing, the rotor shaft, the bearing, the annular bracket, the magnetized female adaptor, the magnetized male adaptor, and the magnetized impeller assembly being concentrically positioned along a central axis;

the rotor shaft being rotatably mounted within the annular bracket by the bearing;

the annular housing being radially mounted around the annular bracket;

the magnetized female adaptor being terminally mounted to the rotor shaft;

the magnetized male adaptor being terminally mounted to the rotor shaft, opposite of the magnetized female adaptor;

the magnetized impeller assembly being slidably engaged within the annular housing;

the magnetized impeller assembly being magnetically engaged with the magnetized female adaptor and the magnetized male adaptor; and the fluid turbine system being in fluid communication with the annular housing.

2. The magnetic energy convertor for vehicle axles as claimed in claim 1 comprises:

the annular housing comprises a first half-housing, a first annular track, an inlet, a second half-housing, a second annular track, and an outlet;

the first annular track traversing into the first half-housing;

the inlet traversing through the first half-housing and into the first annular track;

the inlet being in fluid communication with the first annular track;

the second annular track traversing into the second half-housing;

the outlet traversing through the second half-housing and into the second annular track;

the outlet being in fluid communication with the second annular track; and the inlet and the outlet being in fluid communication with each other through the first annular track and the second annular track.

3. The magnetic energy convertor for vehicle axles as claimed in claim 1 comprises:

the magnetized female adaptor comprises a proximal cylindrical body, an axle opening, a proximal shaft opening, and a plurality of first outer magnets;

the axle opening terminally traversing into the proximal cylindrical body;

the proximal shaft opening terminally traversing into the proximal cylindrical body, opposite of the axle opening;

the axle opening and the proximal shaft opening being concentrically positioned with each other about the proximal cylindrical body;

the plurality of first outer magnets being radially connected around the proximal cylindrical body; and the plurality of first outer magnets being positioned adjacent to the proximal shaft opening.

4. The magnetic energy convertor for vehicle axles as claimed in claim 3 comprises:

the proximal cylindrical body comprises a first base-surface, a second base-surface, a lateral surface, and a chamfered edge;

the first base-surface and the second base-surface being oppositely positioned of each other;

the lateral surface being perpendicularly connected to the second base-surface;

the chamfered edge being angularly connected to the first base-surface;

the lateral surface and the chamfered edge being adjacently connected to each other, in between the first base-surface and the second base-surface;

the axle opening traversing into the proximal cylindrical body from the second base-surface;

the proximal shaft opening traversing into the proximal cylindrical body from the first base-surface;

the chamfered edge being positioned adjacent to the proximal shaft opening; and the plurality of first outer magnets being laterally connected onto the chamfered edge.

5. The magnetic energy convertor for vehicle axles as claimed in claim 1 comprises:

the magnetized male adaptor comprises a distal cylindrical body, a wheel hub connector, a distal shaft opening, and a plurality of second outer magnets;

the wheel hub connector being adjacently connected to the distal cylindrical body;

the distal shaft opening terminally traversing into the distal cylindrical body, opposite of the wheel hub connector;

the wheel hub connector and the distal shaft opening being concentrically positioned with each other about the distal cylindrical body;

the plurality of second outer magnets being radially connected around the distal cylindrical body; and the plurality of second outer magnets being positioned adjacent to the distal shaft opening.

6. The magnetic energy convertor for vehicle axles as claimed in claim 5 comprises:

the distal cylindrical body comprises a first base-surface, a lateral surface, and a chamfered edge;

the first base-surface and the wheel hub connector being oppositely positioned of each other about the distal cylindrical body;

the lateral surface being perpendicularly positioned to the first base-surface;

the chamfered edge being angularly connected in between the first base-surface and the lateral surface;

the distal shaft opening traversing into the distal cylindrical body from the first base-surface;

the chamfered edge being positioned adjacent to the distal shaft opening; and the plurality of second outer magnets being laterally connected onto the chamfered edge.

7. The magnetic energy convertor for vehicle axles as claimed in claim 1 comprises:

the magnetized impeller assembly comprises a plurality of fins, at least one pair of rollers, and a plurality of impeller magnets;

the plurality of fins being radially positioned within a first annular track and a second annular track of the annular housing;

the at least one pair of rollers being symmetrically connected to each of the plurality of fins;

the at least one pair of rollers being rotatably engaged with the first annular track and the second annular track;

the plurality of impeller magnets being radially positioned within the first annular track and the second annular track; and each of the plurality of impeller magnets being radially disposed within a pair of fins from the plurality of fins.

8. The magnetic energy convertor for vehicle axles as claimed in claim 1 comprises:

an inner race of the bearing being radially mounted around the rotor shaft;

the annular bracket being radially mounted around an outer race of the bearing; and a first half-housing and a second half-housing of the annular housing being radially mounted to each other through the annular bracket.

9. The magnetic energy convertor for vehicle axles as claimed in claim 1 comprises:

a plurality of first fasteners;

the magnetized female adaptor comprises a proximal cylindrical body and a proximal shaft opening;

the proximal shaft opening being concentrically engaged around the rotor shaft; and the proximal cylindrical body being radially mounted to the rotor shaft by the plurality of first fasteners.

10. The magnetic energy convertor for vehicle axles as claimed in claim 1 comprises:

a plurality of second fasteners;

the magnetized male adaptor comprises a distal cylindrical body and a distal shaft opening;

the distal shaft opening being concentrically engaged around the rotor shaft; and the distal cylindrical body being radially mounted to the rotor shaft by the plurality of second fasteners.

11. The magnetic energy convertor for vehicle axles as claimed in claim 1 comprises:

the magnetized female adaptor comprises a plurality of first outer magnets the magnetized male adaptor comprises a plurality of second outer magnets;

the magnetized impeller assembly comprises a plurality of fins and a plurality of impeller magnets;

the plurality of impeller magnets being magnetically engaged with the plurality of first outer magnets and the plurality of second outer magnets; and the plurality of fins being magnetically engaged with the plurality of impeller magnets.

12. The magnetic energy convertor for vehicle axles as claimed in claim 1 comprises:

the fluid turbine system comprises a reservoir, a turbine housing, a turbine unit, a generator, and at least one battery;

the turbine unit being rotatably mounted within the turbine housing;

a rotor of the generator being mechanically coupled with the turbine unit, wherein the rotation of the turbine unit axially rotates the rotor of the generator;

the at least one battery being electrically connected with the generator; and the reservoir being in fluid communication with the annular housing and the turbine housing.

13. The magnetic energy convertor for vehicle axles as claimed in claim 12 comprises:

an outlet of the reservoir being in fluid communication with an inlet of the annular housing;

an outlet of the annular housing being in fluid communication with an inlet of the turbine housing; and an outlet of the turbine housing being in fluid communication with an inlet of the reservoir.

* * * * *